Figure 8:
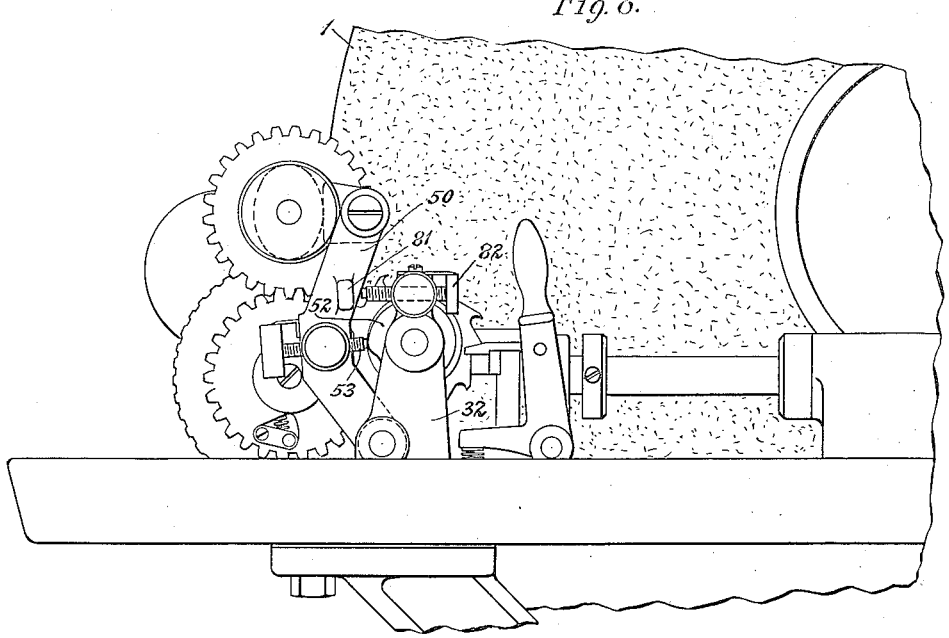

G. H. DAY.
LENS EDGING MACHINE.
APPLICATION FILED AUG. 9, 1910.
1,191,874.
Patented July 18, 1916.
6 SHEETS—SHEET 1.
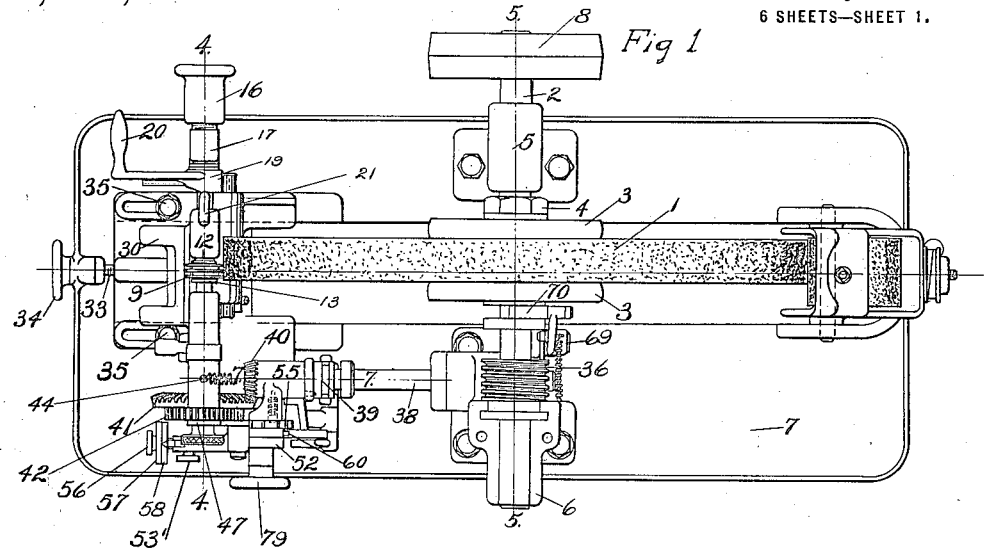
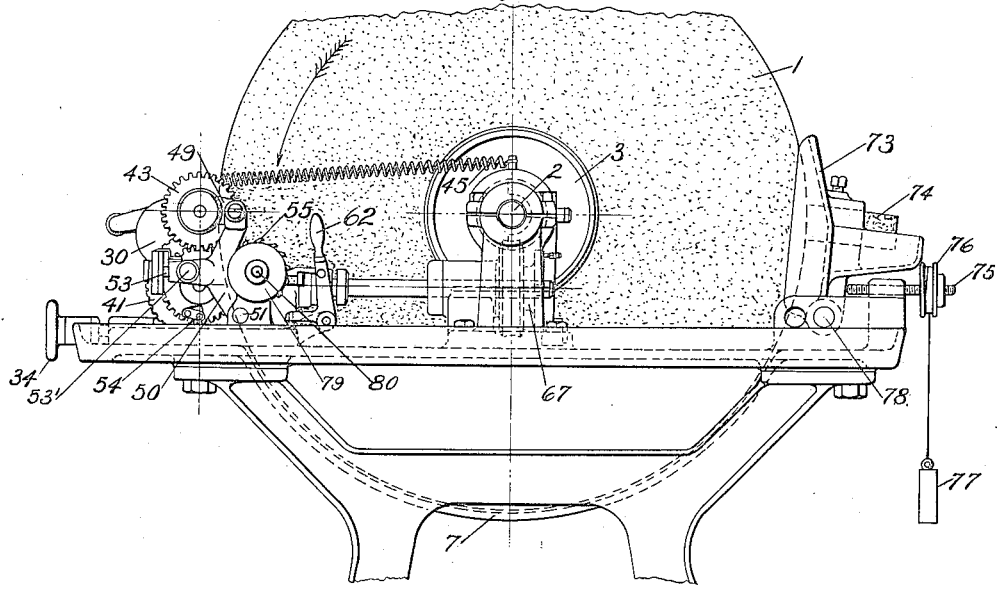
Witnesses.
G. V. Rasmussen
Edw. Shieljoung
Inventor.
George H. Day
By
Attorneys G. H. DAY.
LENS EDGING MACHINE.
APPLICATION FILED AUG. 9, 1910.
1,191,874.
Patented July 18, 1916.
6 SHEETS—SHEET 2.
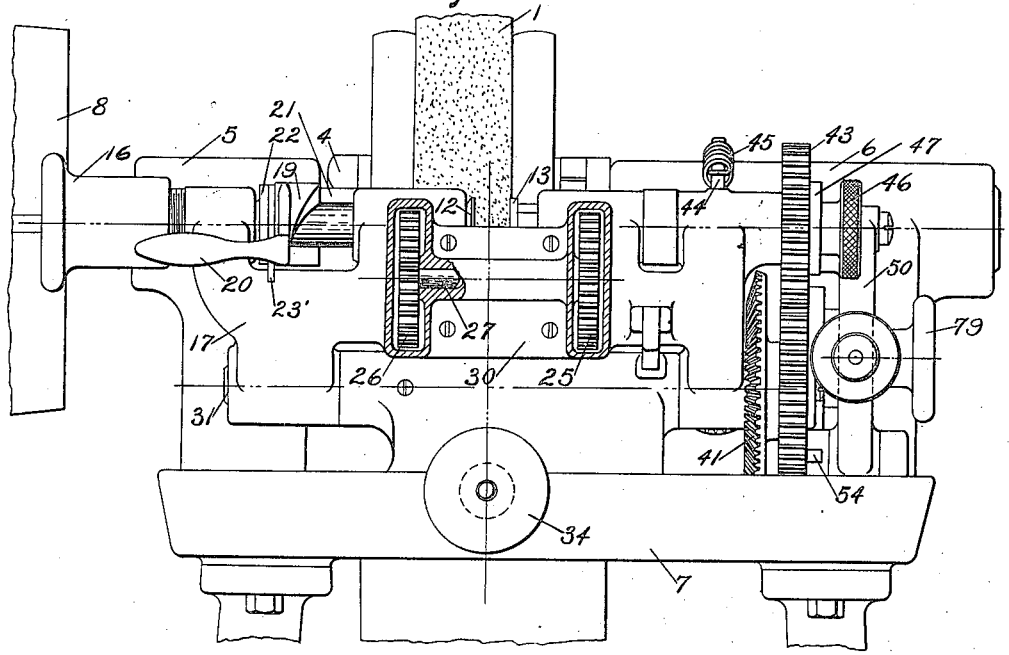
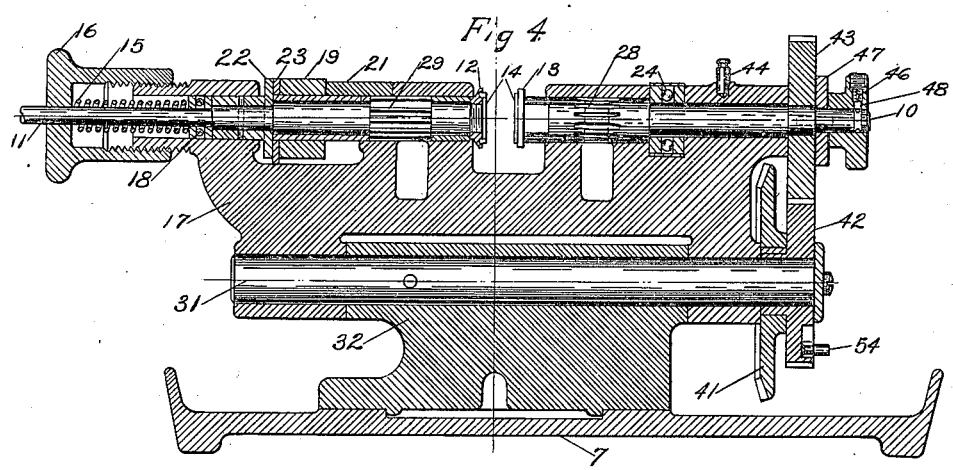
Witnesses.
Inventor.
George H. Day
By
Attorneys

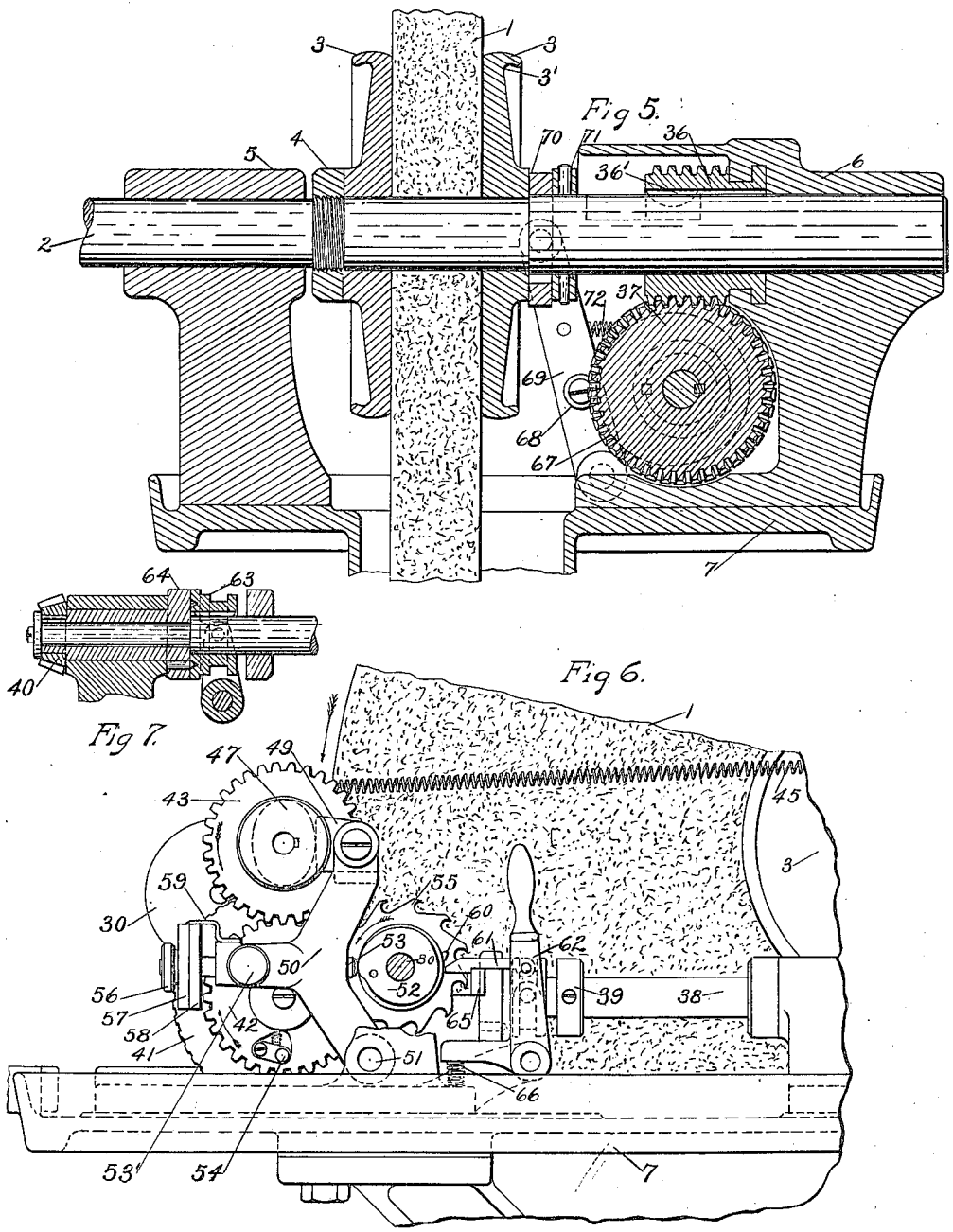

G. H. DAY.
LENS EDGING MACHINE.
APPLICATION FILED AUG. 9, 1910.

1,191,874.

Patented July 18, 1916.
6 SHEETS—SHEET 4.

G. H. DAY.
LENS EDGING MACHINE.
APPLICATION FILED AUG. 9, 1910.

1,191,874.

Patented July 18, 1916.
6 SHEETS—SHEET 5.

WITNESSES:

INVENTOR
George H. Day
BY
ATTORNEY

G. H. DAY.
LENS EDGING MACHINE.
APPLICATION FILED AUG. 9, 1910.
1,191,874.
Patented July 18, 1916.
6 SHEETS—SHEET 6.
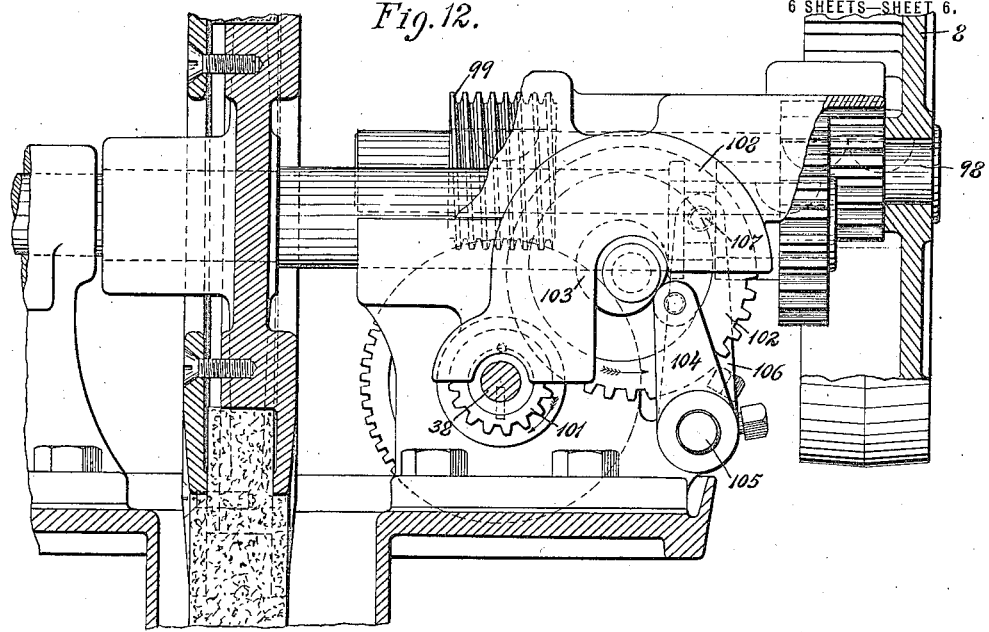
Fig. 12.
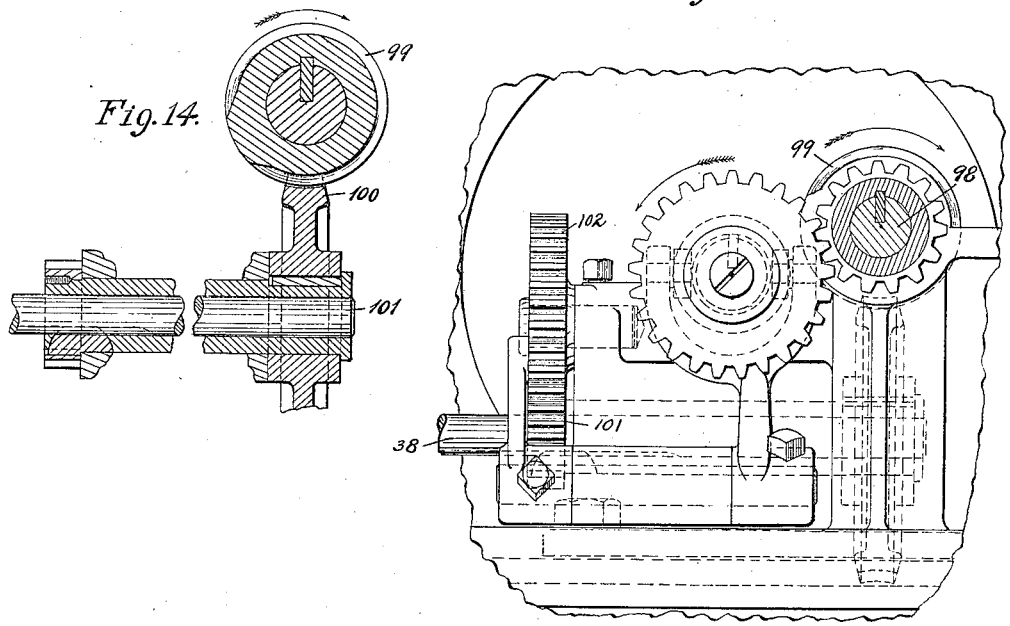
Fig. 13.
Fig. 14.
WITNESSES:
INVENTOR
George H. Day
BY
ATTORNEY

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

LENS-EDGING MACHINE.

1,191,874.

Specification of Letters Patent.   Patented July 18, 1916.

Application filed August 9, 1910.   Serial No. 576,419.

*To all whom it may concern:*

Be it known that I, GEORGE H. DAY, a citizen of the United States, and resident of Southbridge, Worcester county, Massachusetts, have invented certain new and useful Improvements in Lens-Edging Machines, of which the following is a specification.

My invention relates to machines for grinding and smoothing the edges of any usual form of lens such as circular, elliptical, oval and the like and has for its object to provide a machine with which such grinding and smoothing may be accomplished with accuracy and in minimum time.

A further object of my invention is to provide such a machine in which said operations may be performed upon a number of lenses simultaneously.

A still further object of my invention is to provide a machine by means of which the amount of material to be removed from the edges of the lenses in a given time is automatically determined.

Other objects of my invention are: to provide means whereby the final size of the finished lenses is automatically determined and the finishing operation automatically stopped; to provide improved means for quickly placing a number of lenses to be operated upon in working position and to as quickly remove them from said position when finished; to provide improved clamping devices for the lenses being operated upon; to provide improved means whereby oil may be prevented from getting on the grinding surface.

Other objects of my invention will appear as the specification proceeds.

My invention relates more particularly to that class of grinding machines in which a stack of previously roughened lenses is held against the periphery of a suitable grinding stone, said stone and said stack of lenses being then simultaneously revolved upon parallel axes, during which grinding operation a relative lateral movement of stone and lenses is also provided.

Figure 9:
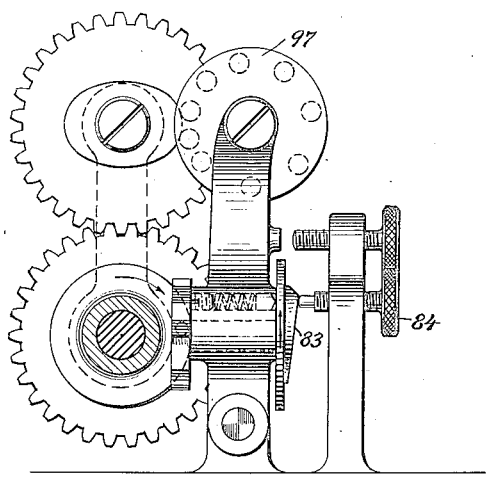
Figure 10:
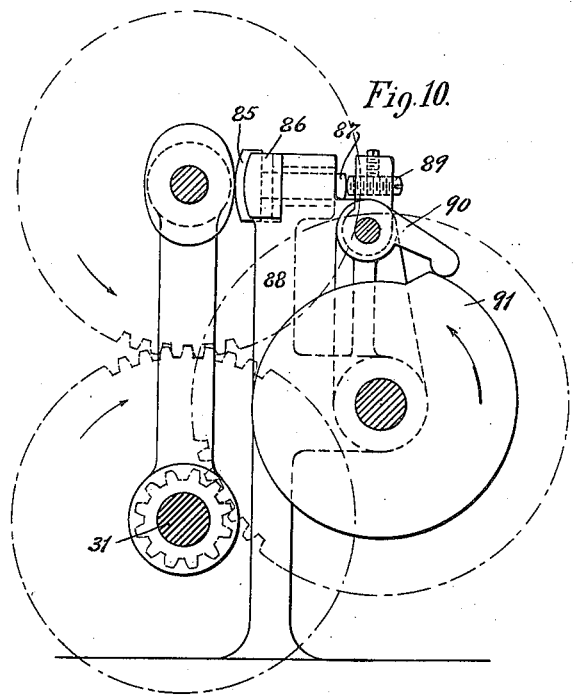
Figure 11:
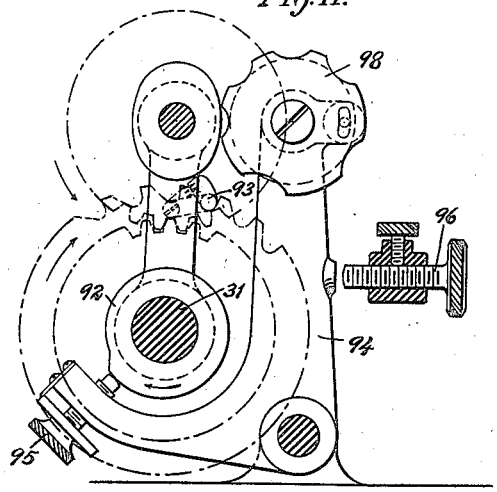

Referring to the drawings, Figure 1 represents a plan view of a preferred form of my machine; Fig. 2 is a side elevation of Fig. 1 (unimportant parts of the structure being broken away); Fig. 3 is an enlarged front elevation of Fig. 1; Fig. 4 is a similar section through the lens-holding spindle taken along the line 4—4 of Fig. 1; Fig. 5 is an enlarged broken section through the grind stone and its supporting spindle taken along the line 5—5 of Fig. 1; Fig. 6 is an enlarged partial side elevation, same view as Fig. 2, showing the cam and gear mechanism used for feeding the lenses against the grind stone, as also the clutch mechanism used in throwing the machine out of action; Fig. 7 is an enlarged sectional detail through the clutch mechanism and taken along the line 7—7 of Fig. 1; Fig. 8 is a view similar to Fig. 6, but showing a positive stop which may be used for determining the maximum feed; Fig. 9 shows a modified form of the cam feed device; Fig. 10 shows a second modification; Fig. 11 shows still a third form of the same device; Fig. 12 is a detail part elevation and part section, showing a modified form of drive; Fig. 13 is an end elevation, part section, of Fig. 12; Fig. 14 is a sectional detail of Fig. 12 showing the means for driving the lens holding spindle.

In the drawings the grind stone 1 is mounted on a spindle 2 and is held in position by flanges 3 between a shoulder, formed by an enlargement of the arbor at the right, and check nut 4; the spindle is supported by bearings 5 and 6 themselves attached to a main frame 7. The grind stone may be driven by a pulley 8.

The lenses to be ground, 9, are held between two co-axial spindles 10, 11 which are provided at their opposing ends with pad holders 12, 13, each of which is recessed to hold a pad 14, preferably formed as a ring of some yielding material, so as to conform to the curvature of such lenses as may be placed between the pads. A coiled spring 15, the tension of which may be regulated by the hand wheel 16, keeps spindle 11 pressed inwardly, so that the lenses 9 are firmly held. To diminish friction, a ball thrust bearing 18 is interposed between spring 15 and spindle 11. Spindle 10 has no axially sliding movement as has spindle 11.

When it is desired to separate spindles 10 and 11, in order to insert or remove a stack of lenses, a cam 19, operated by handle 20, may be used; this cam on its one side presses against the stationary piece 21 fitted to swinging frame 17 and on the other side against the linearly movable but nonrotatable washer 23, which in its turn presses against the split flanged collar 22 itself fastened to spindle 11.

The washer 23 is used to prevent any rotation of spindle 11, when cam 19 is operated, by reason of friction between said cam and the flanged collar 22. To accomplish this result the washer 23 has projections 23' extending down on each side of the swinging frame 17, thus permitting linear but not rotational movement. A ball thrust bearing 24 is provided for spindle 10, as with spindle 11, to diminish friction. Spindles 10 and 11 are rotated as one by means of intermediate gears 25 and 26 fixed to shaft 27 and meshing with pinions 28 and 29 cut on the spindles themselves. Pinion 29 is determined of sufficient length to permit the axial movement necessary in inserting and removing the lenses 9. The gears 25 and 26 are housed and the shaft 27 is journaled in a bracket 30 fastened to frame 17.

The frame 17 swings on a shaft 31 fixed in a base 32 which is adapted to slide in frame 7. A screw 33 and hand wheel 34 permits in and out adjustment of said base 32 and cap screws 35 may be used to clamp the base fast in any determined position. By means of this swinging frame 17 the lenses 9 may be brought into variable relation to the stone.

The lenses are rotated, from the grind stone shaft 2, simultaneously with the stone through a train of gears comprising a worm 36 keyed slidably to shaft 2 and engaging a worm gear 37 fixed to shaft 38. This shaft, through a clutch 39, revolves a bevel gear 40 meshing with a second similar gear 41 having adjacent thereto a spur gear 42 which meshes with a similar gear 43 keyed to shaft 10.

Adapted to slip on and off spindle 10, but keyed against rotation thereon, is a flat hardened steel pattern or former 47 whose peripheral configuration is the same as that desired for the lenses to be ground. A small hand wheel 46 in which there is a spring pin 48 adapted to engage a peripheral groove in spindle 10, holds the former in position and permits of its quick removal and exchange for a pattern or former of different outline.

A spring 45 having one end permanently fixed to the machine frame and the other to a pin 44 at the top of the swinging arm 17, keeps this frame continually pressed forward toward the stone so that the former 47 lies against a shoe 49. This shoe is fixed to the upper arm of a three-armed lever 50 pivoted at its bottom on shaft 51. The inward throw of lever 50 is limited by a contact member in the shape of an adjusting screw 53 attached to said lever and engaging a cam 52, which cam is advanced through a definite and equal angle for each revolution of gear 42. This advance is accomplished by a spring pin 54 so positioned as to engage, as it comes around, a tooth of a ratchet 55 adjacent and fixed to the cam. The edge of this cam 52 is given such curvature as to permit the lever 50 and hence the shoe 49 to approach the center of the grind stone by a definite amount for each revolution of the former 47. The size to be given the completed lenses may be determined by suitably setting screw 53 by means of a micrometer head comprising a flange 58 forming part of the screw and a loose graduated ring 57 which can be clamped by means of a nut 56. By shifting this ring standard sizes may be determined; the ring is also of service in changing from one size to another when reading it in connection with pointer 59. Screw 53 being set in a desired position may be permanently clamped by use of the clamping screw 53'.

Fixed in the hub of ratchet 55 is a pin 60 which, once for each revolution of the ratchet, will lift a latch lever 61 holding the clutch lever 62 in position. This clutch lever engages clutch spool 63, which in turn keeps engaged with sleeve 64 attached to gear 40, and will be thrown toward the center of the stone, when latch lever 61 is thus released, by means of spring 66. This disengages the clutch and stops the rotation of the lenses 9.

The worm 36 is provided with a flange at one end which is recessed into the bearing 6, thus keeping it linearly fixed; but the keyway with which key 36' is engaged is of sufficient length to permit shaft 2 to have a certain freedom of movement lengthwise.

The reciprocating motion required by the grind stone as it is revolved is given it by means of a cam 67 fixed to shaft 38; this cam engages a roller 68 attached to a lever 69 pivoted to frame 7 below and forked at the top to engage the groove 70 formed between the flange 3 and collar 71. A spring 72 keeps the roller 68 pressed against the cam. The grinding surface of the stone is kept flat and in good condition by means of a hone comprising a swinging frame 73 pivoted at 78, carrying a suitable wedge or slab 74 of abrasive material. A screw 75 to which is fixed a flanged wheel 76 is fitted to the frame so that it may be used to force the hone against the stone; where it is desired to maintain a constant pressure between the hone and the stone a weight 77 is hung from the wheel 76. The circular plates 3 between which the grind stone is held are thinned from center to edge and provided with an outwardly and centrally extending peripheral flange so as to form a peripheral groove 3' opening toward the axis of the stone; as so arranged any oil which may be carried from the shaft on to the flanges will be caught in the groove 3' and will be unable to flow over the edge upon the stone itself. To bring the lenses 9 down into contact with the grind stone 1 without loss of time, there is provided a hand wheel 79 fixed to shaft 80 which carries the cam 52.

Fig. 8 shows a modification in which the finished size of the lens may be altered without varying the adjustment of screw 53. Here an additional lug 81 is provided upon lever 50 and an additional screw 82 upon the sliding frame 32 of the machine, said screw being arranged to engage said lug. By running up this screw sufficiently, lug 81 contacts therewith before screw 53 has been able to follow its cam surface to the limit. A positive stop is therefore constituted.

In Fig. 9 the cam 83 is upon a movable arm and the adjusting screw 84 upon a part of the sliding frame 32 instead of the reverse as in the preceding figures. Furthermore, a face cam is used instead of an eccentric cam and, as a consequence, the axis of the cam is at right angles to the lens spindle instead of parallel thereto.

In Fig. 10 the shoe 85 is arranged to be pushed in and out from a slotted bushing 86, being fixed to a short spindle 87 slidably fitted to a bracket 88 fixed to frame 7, and adapted to be actuated by the screw 89 attached to the lever 90; this lever is positioned by the cam 91. The cam may be driven by a train of reducing gears from shaft 31 as indicated or in any other of a variety of ways. When 85 is in at its extreme limit, the bushing 86 will serve as a face stop for the former to rotate against.

Fig. 11 shows still a third modification of the cam feed arrangement. Here the cam 92 is loosely mounted on shaft 31 and adapted to be advanced one step for each revolution by means of the pin 93. The pivoted arm 94 which carries the adjustable stop 95 is carried forward from below as shown, while the limit stop is shown at 96.

In Fig. 9 the shoe 97 is a disk having pairs of laterally projected pins about its periphery, the members of each pair being at varying distances apart. This disk can be rotated so as to cause the former to bear between and against any desired pair of pins thereby altering the specific curvature of the resultantly edged lenses without changing the general character of such curvature.

In Fig. 11, I have provided the disk 98 with a series of peripheral recesses the opposite ends of each of which are equivalent to a pair of pins as in Fig. 9.

In Figs. 12-14 I show a modification in which the grindstone and the lens holding spindle are separately driven from a common main shaft the former through interchangeable gears so that as the stone wears down its speed of rotation may be maintained constant; any of the various types of feed for the lens holding spindle shown in the several views may be used with this form of drive equally as well as with the previously described drive. In these figures the pulley 8 is fixed to a main shaft 98, itself suitably mounted to rotate upon the main frame of the machine, to which is attached a worm 99 arranged to mesh with a worm wheel 100 keyed to the shaft 38 which drives the lens holding spindle. A spur gear 101 fixed to shaft 38 and meshing with a similar gear 102 to which is fixed a cam 103, actuates a lever 104 rigidly connected, through a shaft 105, to a lever 106 carrying a pin 107 which engages a ring shaped recess 108 on the grindstone shaft thus giving a reciprocating movement to the stone as it is revolved.

While I have indicated a few ways in which my improvements in lens edging machines may be varied, I do not wish to limit myself to such ways but, on the contrary, wish to make it clear that many alterations of detail may be made without departing from the spirit of my invention which I have embodied in the following claims:

I claim:

1. In combination, in a lens edging machine, a revoluble lens holding spindle adapted to be pressed inwardly closer to the stone as the lens material is ground away, a stop for limiting said inward movement, and means operatively connected with said spindle for permitting said stop to be moved inwardly as the spindle revolves.

2. In combination, in a lens edging machine, a revoluble lens holding spindle adapted to be pressed inwardly closer to the stone as the lens material is ground away, driving means for said spindle, a stop for limiting said inward movement, and means actuated by said driving means for permitting said stop to be moved inwardly as the spindle revolves.

3. In combination, in a lens edging machine, a revoluble lens holding spindle adapted to be pressed inwardly closer to the stone as the lens material is ground away, a pattern or former fixed to said spindle, a pivoted lever provided with a shoe adapted to engage said pattern and with a contact member, a cam arranged to engage said contact member, and means for moving said cam with reference to the contact member as the spindle is revolved so as to definitely control the inward movement of said spindle.

4. In combination, in a lens edging machine, a revoluble lens holding spindle adapted to be pressed inwardly closer to the stone as the lens material is ground away, a pattern or former fixed to said spindle, a pivoted lever provided with a shoe adapted to engage said pattern and with an adjusting screw, a cam arranged to engage said adjusting screw, and means for moving said cam with reference to the adjusting screw as the spindle is revolved so as to definitely control the inward movement of said spindle.

5. In combination, in a lens edging machine, a revoluble lens holding spindle adapted to be pressed closer to the stone as the lens material is ground away, a cam for regulating the approach of the spindle to the stone, means for advancing said cam by a definite amount for each revolution of the spindle, a clutch between said spindle and the driving gear, a clutch lever controlling said clutch and provided with a locking latch, and means fixed to said cam for releasing said locking latch.

6. In combination, in a lens edging machine, a revoluble lens holding spindle adapted to be pressed closer to the stone as the lens material is ground away, a cam and means controlled thereby for regulating the approach of the spindle to the stone, means for advancing said cam by a definite amount for each revolution of the spindle, a clutch between said spindle and the driving gear, a clutch lever controlling said clutch and provided with a locking latch, and means fixed to said cam for releasing said locking latch.

7. In combination, in a lens edging machine, a revoluble lens holding spindle adapted to be pressed closer to the stone as the lens material is ground away, a cam for regulating the approach of the spindle to the stone, means for advancing said cam as the spindle is revolved, a clutch between said spindle and the driving gear, and means operated by said cam for releasing said clutch.

8. The combination with means for clampingly engaging a lens therebetween, of means for rotating the lens and clamping devices, a former axially secured to one of the clamping members, an operating tool, a shoe mounted in fixed relation to the tool, said shoe having a plurality of pairs of unequally spaced contact points, and means for holding one pair of said points in engagement with the former.

9. In a lens edging machine, the combination of a spindle, a former adapted to be slipped on and off said spindle, means to hold said former against rotation upon said spindle, a collar adapted to slip on and off said spindle, and spring means arranged to engage both shaft and collar and prevent linear movement of the latter, as and for the purpose described.

10. In a lens edging machine, the combination of a spindle provided with a circumferential groove, a removable former adapted to slip over the end of said spindle, a key between said former and the spindle, and a collar also adapted to slip over the end of said spindle said collar being provided with a spring pressed pin adapted to engage said groove, as and for the purpose described.

11. The combination with a rotatable lens holder, of a former carried thereby, a tool, a shoe supported in fixed relation to the tool, said shoe having a plurality of pairs of bearing points, the points of the various pairs being unequally spaced and adapted to partially receive the former therebetween, whereby engagement of the former between different points varies the relative movement of the tool and holder to control the shape of a lens held therein.

12. In combination with a lens edging machine having a grindstone and a lens holding spindle of the general character described; a former upon said spindle, a cam, a contact member the position of which is varied with the position of the cam and against which the former is adapted to be continuously pressed, and automatic means for moving said cam a definite amount for each revolution of the spindle.

13. In combination with a lens edging machine having a grindstone and a lens holding spindle of the general character described; a former upon said spindle, a cam, a movable piece between said former and said cam adapted to be contacted with both the cam and the former, and automatic means for moving said cam a definite amount for each revolution of the spindle.

14. In combination with a lens edging machine having a grindstone and a lens holding spindle of the general character described; a former upon said spindle, a cam, a pivoted arm adapted to contact with the cam and having a shoe adapted to be continuously pressed upon by the former, and means mechanically related to the lens holding spindle adapted to engage and rotate the cam a definite amount for one revolution of the former.

In testimony whereof I have hereunto set my hand in the presence of two subscribing witnesses.

GEORGE H. DAY.

Witnesses:
  CHARLES I. KING,
  CORA L. FREEMAN.